(12) United States Patent
Xi et al.

(10) Patent No.: US 9,350,157 B2
(45) Date of Patent: May 24, 2016

(54) CONTROL AND PROTECTION DEVICE FOR LOW-VOLTAGE ELECTRICAL APPLIANCE

(71) Applicants: SEARI ELECTRIC TECHNOLOGY CO., LTD., Shanghai (CN); ZHEJIANG CHINT ELECTRICS CO., LTD., Yueqing, Zhejiang Province (CN)

(72) Inventors: Hong Xi, Shanghai (CN); Ping Zeng, Shanghai (CN); Huiyu Ji, Shanghai (CN); Feng Jia, Shanghai (CN); Changxun Gu, Shanghai (CN); Di Zhang, Shanghai (CN); Beiming Huang, Shanghai (CN); Jianrong Lin, Shanghai (CN)

(73) Assignees: SEARI ELECTRIC TECHNOLOGY CO., LTD., Shanghai (CN); ZHEJIANG CHINT ELECTRICS CO., LTD., Yueqing (CN)

( * ) Notice: Subject to any disclaimer, the term of this patent is extended or adjusted under 35 U.S.C. 154(b) by 147 days.

(21) Appl. No.: 14/369,077

(22) PCT Filed: Dec. 25, 2012

(86) PCT No.: PCT/CN2012/087389
§ 371 (c)(1),
(2) Date: Aug. 15, 2014

(87) PCT Pub. No.: WO2013/097696
PCT Pub. Date: Jul. 4, 2013

(65) Prior Publication Data
US 2014/0368961 A1    Dec. 18, 2014

(30) Foreign Application Priority Data

Dec. 26, 2011 (CN) .......................... 2011 1 0442031
Dec. 26, 2011 (CN) .......................... 2011 1 0443019

(51) Int. Cl.
*H02H 3/00* (2006.01)
*H02H 3/08* (2006.01)
(Continued)

(52) U.S. Cl.
CPC ........... *H02H 3/083* (2013.01); *H01H 71/0228* (2013.01); *H01H 71/1018* (2013.01);
(Continued)

(58) Field of Classification Search
USPC .................................................. 361/42, 115
See application file for complete search history.

(56) References Cited

U.S. PATENT DOCUMENTS

| 5,163,175 A | 11/1992 | Mori et al. | |
|---|---|---|---|
| 2011/0310521 A1* | 12/2011 | Dauer | H01H 9/22 361/102 |
| 2012/0032813 A1* | 2/2012 | Chen | H01H 83/04 340/649 |

FOREIGN PATENT DOCUMENTS

| CN | 1378699 A | 11/2002 |
|---|---|---|
| CN | 101494143 A | 7/2009 |

(Continued)

OTHER PUBLICATIONS

International Search Report issued in PCT/CN2012/087389 mailed on Apr. 4, 2013 (5 pages).
(Continued)

*Primary Examiner* — Danny Nguyen
(74) *Attorney, Agent, or Firm* — Osha • Liang LLP

(57) ABSTRACT

Disclosed is a control and protection device for a low-voltage electrical apparatus, comprising a pedestal and a control and protection module. The control and protection module may be plugged into the pedestal and is replaceable. The pedestal comprises a base and a housing, and is further provided with a moving contact, a static contact, and a current conductor connected to a main circuit current; a control electromagnet operation mechanism for controlling close and open of the moving contact and the static contact according to a control signal, and maintaining a close or open status of the moving contact and the static contact; a manual operation knob providing a control signal for controlling the close and open of the moving contact and the static contact; a control contact connected to the manual operation knob; and a current sensor for detecting a current that flows through the main circuit current conductor and generating a sensing signal. The control and protection device further comprises: a signal processing unit for controlling a state of the control electromagnet according to the sensing signal via an electrical circuit; and a tripping device for controlling actions of the operation mechanism with a mechanical connection in response to the signal processing unit. The current sensor has a secondary circuit connection detection device.

15 Claims, 6 Drawing Sheets

(51) Int. Cl.
*H01H 71/12* (2006.01)
*H01H 71/24* (2006.01)
*H01H 73/42* (2006.01)
*H02H 3/04* (2006.01)
*H01H 71/02* (2006.01)
*H01H 71/10* (2006.01)
*H01H 89/08* (2006.01)
*H01H 89/06* (2006.01)
*H02H 3/16* (2006.01)
*H01R 13/713* (2006.01)
*H01H 73/04* (2006.01)

(52) U.S. Cl.
CPC .......... *H01H71/123* (2013.01); *H01H 71/125* (2013.01); *H01H 71/24* (2013.01); *H01H 73/42* (2013.01); *H01H 89/08* (2013.01); *H02H 3/04* (2013.01); *H01H 73/045* (2013.01); *H01H 89/06* (2013.01); *H01R 13/7135* (2013.01); *H02H 3/16* (2013.01)

(56) References Cited

FOREIGN PATENT DOCUMENTS

CN 101924344 A 12/2010
EP 0 437 220 A2 7/1991
JP 11-299084 A 10/1999

OTHER PUBLICATIONS

Written Opinion of the International Searching Authority issued in PCT/CN2012/087389 mailed on Apr. 4, 2013 (10 pages).

Official Action dated Sep. 2, 2014, issued by The State Intellectual Property Office of The People's Republic of China in related Chinese Patent Aplication No. CN 201110442031.9, with a partial English translation of its Search Report (9 pages).

* cited by examiner

CONTROL AND PROTECTION DEVICE FOR LOW-VOLTAGE ELECTRICAL APPLIANCE

BACKGROUND OF THE INVENTION

1. Field of Invention

The present invention relates to the field of low-voltage electrical apparatuses, and more particularly, to a control and protection device of a low-voltage electrical apparatus, where the control and protection device of a low-voltage electrical apparatus has a secondary loop connection detection device.

2. Related Art

Breakers may be used in infrequent switching of circuits and infrequent startup of motors, may be used in distribution networks to distribute electricity, may be used in the overload, short-circuit, and undervoltage protection of circuits and power supply equipments. Contactors may be used in frequently close and open circuits, and may connect, disconnect, and carrying regulated overload currents. Contactors generally have the ability of frequent operations and have long mechanical and electrical lifetime.

Control and protection of electrical equipments may be implemented by combinations of a plurality of separate devices such as breakers, contactors, thermal relays or motor protectors, and may also be implemented by a multi-functional electrical apparatus having both control and protection functions. A control and protection device consisted of a plurality of separate devices has the problem of coordination among each of the components, and is complex in installation and connection. The plurality of separate devices occupy a relatively large volume, increase costs of manufacture and usage, and are not suitable for use in limited spaces having a relatively small volume.

An electrical equipment having an device with both functions of a contactor and a breaker is disclosed in the Chinese Patent, entitled "Device Having Contactor and Breaker Functions", and with an issue number CN1258798C. The electrical equipment has a control electromagnet and a protection device, each of which functions on moving contacts via a multi-polar device in response to manual control and electrical fault detection respectively. An electromagnet tripping device is added to a contact control mechanism. Preferably, a replaceable protection device is connected to the magnet of the relay via control circuits, and is connected to the control mechanism via tripping circuits. The power supply of the electromagnet is output to control circuits, and a tripping signal is output to the tripping circuits when a fault occurs. The electromagnet is DC type and the protection device adjusts the power supply voltage of the electromagnet. According to the solution disclosed in CN1258798C, the electromagnet tripping device is added into the contact control mechanism, the protection device is connected to the electromagnet via the control circuits and is connected to the control mechanism via the tripping circuits. Since the tripping device is outside the protection device, and the tripping device and the protection device are disposed in different modules, their electrical connection shall be conducted via external electrical connectors. Transferring signals via connectors and electrical circuits may cause decrease of reliability due to connection quality and electrical disturbance. CN1258798C also mentions, the protection device comprises a device for detecting currents flowing through a power supply conductor. To detect currents flowing through the power supply conductor, the power supply conductor must go through a detecting device, which generates a large amount of heat during usage and will greatly degrade the performance of electrical elements within the protection device and use lifetime.

A switching electrical apparatus having control and protection functions is disclosed in the Chinese Patent Application, entitled "Switching Apparatus Having Control and Protection Functions", and with an publication number CN101494143. An AC-DC replaceable modular structure electromagnetic system is utilized, releasers, auxiliary contacts, and communication modules are respectively replaceable modules, and a plurality of auxiliary contact modules and communication modules may be selectively accessed based on users' requirements. The system not only has characteristics and functions of contactors that may be frequently operated and has long lifetime, but also has characteristics and functions of breakers that permits control, protection, and quick break. The switching electrical apparatus of this invention not only has the function of selecting releasers based on voltage type and rated current, but also has the function of voluntarily designing a turning ratio of overload and short-circuit protection, releaser grade, and number of stages of a load motor. The switching apparatus of this invention may be well-adapted, and has excellent replaceability on accessory access, requires less product types and less accessory varieties and types, has a compact overall structure, small volume, and long lifetime, greatly facilitates use and management of users, and increases adaption scope and reliability of the product. The switching apparatus having control and protection functions as mentioned in CN101494143 has a switch connected between a control power supply terminal and an electromagnet, ON/OFF status of the electromagnet is controlled by controlling the connected switch. The voltage type of the control power supply is AC voltage or DC voltage, and the voltage type of the electromagnet is selected based on the voltage type of the control power supply terminal. Or on the other hand, the voltage type of the electromagnet is AC voltage or DC voltage, and the voltage type of the control power supply terminal is selected based on the voltage type of the electromagnet. Such requirements increase restriction conditions during product usage, or increase number of varieties of products to meet usage requirements under different situations, greatly increase production and management costs, and narrow the scope of usage.

A multi-functional control and protection switching apparatus is disclosed in the Chinese Patent Application, entitled "A Multi-Functional Control and protection Switching Apparatus", and with a publication number CN101924344. The switching electrical apparatus comprises a main circuit, a control electromagnet, a release electromagnet, and a power module of an operation mechanism. The operation mechanism controls ON/OFF status of a power supply circuit of the electromagnet by mechanically controlling a contact. The operation mechanism is mechanically correlated with a signaling contact module and a release electromagnet, and conducts the disconnection and connection of the main circuit via a transmission mechanism. The operation mechanism comprises a control and protection module and a power supply module. The control and protection module comprises a release electromagnetic drive circuit, a current sensor, and a signal processing control unit. The power supply module respectively provides power supply to the control electromagnet drive circuit, the release electromagnetic drive circuit, and the signal processing control unit. The multi-functional control and protection switching apparatus of this invention utilizes a all-in-one modular structure design to provide a switching apparatus that has control functions of a contactor, the short-circuit breaking functions of a breaker, and the overload protection functions of an overload relay. The control and protection module provided in CN101924344 comprises a release electromagnet drive circuit and a current sensor. A primary loop of the current sensor is connected to the main circuit via a clamp or a plug, and an induction signal of the secondary loop of the current sensor is connected to the signal processing control unit, so as to detect and determine the main circuit currents. Since the control and protection module comprises the current sensor, the heat generated during the usage of the current sensor may influence the usage performance and lifetime of neighboring elements. Since the primary loop of the current sensor is connected to the main circuit via a clamp or a plug, the way of connection increases resistance and temperature at the connection position. The reliability of connection will directly influence the measurement precision of the current sensor so as to influence the whole product.

A modularized multi-functional switching apparatus is disclosed in the Chinese Patent Application, entitled "A Modularized Multi-Functional Switching Apparatus", and with a publication number CN01923988. The switching apparatus comprises: a pedestal 1, a case 2, an electromagnetic transmission mechanism 5, an operation mechanism 4, and a main circuit contact set 3. The main circuit contact set 3 is equipped with a connector terminal on its rear end, and may connect to a load via a lead or a conductive row. An inner surface on the rear end of the case 2 fits an inner surface of a rear end of the main circuit contact set 3. The switching apparatus may also comprise an auxiliary module, a thermal magnetic releaser, a digitalized controller, and an isolation mechanism. The modularized multi-functional switching apparatus utilizes a modularized structure design, selects different modules to constitute different types of products, and has a small volume. Coordination of control and protection is implemented inside the product. The product is convenient for wiring, has high reliability, saves energy and material, and has relatively high economic and social benefits. The modularized multi-functional switching apparatus disclosed in. CN101923988 utilizes a thermal magnetic releaser to implement overload protection, but has the disadvantage that the number of products increases and the production and management costs increase since protection of different scales of current grades require thermal magnetic releasers of different current scales. Further, the digitalized controller is not only required to connect to the thermal magnetic releaser, but also required to connect to a contact set terminal via screws. This way of connection makes the modular assembling indirect and inconvenient, and may also influence the reliability of connection.

The existing protection devices are all mechanical switching electrical apparatuses having contactor and breaker functions, thus the devices require a large number of switches so as to meet the requirements of different power supply voltages and currents of desired protection scope. Further, by controlling the main contact via an electromagnet, the switching electrical apparatus having contactor and breaker functions has limited scope of protection and cannot achieve high breaking ability of breakers since the electromagnet cannot meet the demands of quickly separating the main contact when functioning as a breaker.

Besides, for a current detection device disposed outside the protection module, the reliability of mutual plug-ins between its secondary loop and the protection module is related to the operating reliability of the control and protection switching apparatus and the safety of a primary loop to which it belongs. One possible situation is: the whole control and protection switching apparatus is in a closed status, but the secondary loop of the current detection device is not reliably inserted with the protection module so that the protection module cannot obtain the reaction of a current transformer to primary current. At this time, once a fault occurs in the primary loop, the protection module will not detect a short-circuit current. Therefore, it cannot send out a signal for breaking the primary loop and will cause an accident. Therefore, it is necessary to detect the connection reliability of the secondary loop of the current detection device.

SUMMARY

The present invention intends to provide a modularized, replaceable, and integrated electrical apparatus having control and protection functions, the electrical apparatus also has a secondary loop connection detection device.

According to an embodiment of the present invention, a control and protection device of a low-voltage electrical apparatus is provided. The device comprises a pedestal and a control and protection module, the control and protection module is replaceable and is plugged to the pedestal.

The pedestal has a base and a housing, within the pedestal, it includes:

a moving contact, a static contact, and a current conductor connecting to a main circuit;

a control electromagnet and an operation mechanism, the control electromagnet and the operation mechanism controlling the moving contact and the static contact to close or open in response to a control signal, the control electromagnet and the operation mechanism maintaining the close or open statuses of the moving contact and the static contact;

a manual operation knob, providing the control signal for controlling the close or open of the moving contact and the static contact;

a control contact connected to the manual operation knob;

a current sensor, detecting a current that flows through the current conductor connecting to the main circuit and generating a sensing signal.

Within the control and protection module, it includes:

a signal processing unit, controlling the status of the control electromagnet by electrical circuits in response to the sensing signal;

a tripping device, controlling operations of the operation mechanism through mechanical connection in response to the signal processing unit.

According to an embodiment, the base comprises therein:

a multi-polar contact including a static contact and a moving contact;

a contact bridge on which the moving contact is disposed;

a spring connected to the contact bridge, the spring applying a spring force to the contact bridge so as to drive the contact bridge and the moving contact to move towards the static contact and make the moving contact and the static contact close;

a contact support connected to the contact bridge, the contact support making the static contact and the moving contact open;

a first current conductor and a second current conductor connecting to the main circuit, the static contact being disposed on the first current conductor and the second current conductor connecting to the main circuit, a power supply terminal being disposed on the first current conductor while a load terminal being disposed on the second current conductor;

arc extinction chambers being disposed on both sides of the moving contact and the static contact.

According to an embodiment, the base comprises therein: baffle plates disposed on the first current conductor and the second current conductor, the baffle plates isolating the moving contact, the static contact, the contact bridge, the contact support, the arc extinction chamber, the first current conductor, and the second current conductor within the base.

According to an embodiment, the housing is connected to the base, the housing is isolated with the base via the baffle plates, the housing comprises therein:

a current sensor being secured on the baffle plates, the current sensor connecting to a second power supply conductor to form a primary loop, a secondary loop of the current sensor outputting a sensing signal to a signal processing control unit;

a control electromagnet comprising a coil and a counterforce spring, the counterforce spring connecting to the contact support via a transmission member, the counterforce spring applying a spring force to the contact support via the transmission member so as to make the moving contact and the static contact open;

an operation mechanism, the operation mechanism connecting to the contact support through a connection rod and the transmission member, the operation mechanism applying a maintenance force to the contact support via the connecting rod and the transmission member so as to maintain the moving contact and the static contact open;

a control contact, the control contact connecting to the manual operation knob, the status of the control contact being associated with the status position of the manual operation knob.

According to an embodiment, the housing further comprises therein an auxiliary contact, a signaling contact, and an alai iii contact, where the auxiliary contact, the signaling contact, and the alarm contact outputting status signals.

According to an embodiment, the base has a wiring terminal disposed thereon, the wiring terminal controls a power supply voltage, an end of the wiring terminal is connected to the control contact.

According to an embodiment, the manual operation knob rotates clockwise or anticlockwise, the manual operation knob connects to the operation mechanism via a driving mechanism, the status position of the manual operation knob is associated with the positions of the moving contact and the static contact, a releaser component in the operation mechanism is reset by rotating the manual operation knob anticlockwise. The status position of the manual operation knob is associated with the control and protection module, the status position of the manual operation knob is in a position that makes the moving contact and the static contact open while the control and protection module is in a pluggable status, the manual operation knob is in a position that makes the moving contact and the static contact close while the control and protection module is in a locked status.

According to an embodiment, the manual operation knob is clamped into the control and protection module; or the manual operation knob comprises a handle, when the manual operation knob makes the moving contact and the static contact close, the handle is clamped onto the control and protection module so that the control and protection module is locked, when the manual operation knob makes the moving contact and the static contact open, the handle is separated from the control and protection module so that the control and protection module is pluggable.

According to an embodiment, the control and protection module comprises therein:

a signal input connected to the current sensor, the signal input receiving the sensing signal output from the current sensor;

a signal processing unit connected to the signal input, the signal processing unit receiving the sensing signal of the current sensor from the signal input and outputting a tripping instruction;

a tripping device connected to the operation mechanism via a mechanical member, the tripping device actuating a releaser component in the operation mechanism via the mechanical member in response to the tripping instruction so as to make the moving contact and the static contact open.

According to an embodiment, the signal processing unit comprises:

an electrical protection device for protecting the tripping device;

an electrical control device connected to the control electromagnet, the electrical control device connecting to a coil of the electromagnet via connection wires and converting the status of the control electromagnet.

According to an embodiment, the current sensor comprises a secondary loop connection detection device, the secondary loop connection detection device comprises:

a three-phase current transformer disposed inside the current detection device, a second end of each transformer in the three-phase current transformer connecting together to form a common end, a first end of each current transformer in the three-phase current transformer being independent from each other;

first verification terminals disposed inside the current detection device, each of the first verification terminals being connected to each other;

a male terminal formed by the common end, the first end of the three-phase current transformer, and the first verification terminal;

a receiving terminal disposed inside the protection module, the receiving terminal comprising a receiving terminal of the three-phase current transformer and a receiving terminal of the common end;

second verification terminals disposed inside the protection module, the second verification terminals being independent from each other;

a female terminal formed by the receiving terminal of the common end, the receiving terminal of the three-phase current transformer, and the second verification terminals;

wherein the female terminal matches the male terminal, the receiving terminal of the common end matches the common end, the receiving terminal of the three-phase current transformer matches the first terminal of the three-phase current transformer, the first verification terminals matches the second verification terminals.

According to an embodiment, within the secondary loop connection detection device: there are two first verification terminals and the two first verification terminals are disposed on both sides of the common end and the first end of the three-phase current transformer; there are two second verification terminals and the two second verification terminals are disposed on the receiving terminal of the common end and both sides of the receiving terminal of the three-phase current transformer.

According to an embodiment, within the secondary loop connection detection device: the length of the first verification terminals is shorter than the length of the common end and the first terminal of the three-phase current transformer; the length of the second verification terminals is shorter than the length of the receiving terminal of the common end and the receiving terminal of the three-phase current transformer.

According to an embodiment, within the secondary loop connection detection device: connection detection is performed on the second verification terminals that are independent from each other so as to convert the level status of an I/O port of a microprocessor in the protection module, the level status of the I/O port is determined by the microprocessor; under the situation that the primary loop is disconnected, when the level is high, the microprocessor sends a signal for connecting the primary loop; when the level is low, the microprocessor prohibits sending the signal for connecting the primary loop; under the situation that the primary loop is connected, when the level is high, the microprocessor maintains the present status; when the level is low, the microprocessor sends a signal for disconnecting the primary loop; converting the ON/OFF status of the primary loop by detecting the connection of the secondary loop with the current detection device.

According to an embodiment, within the secondary loop connection detection device: a resistor is disposed between respective secondary winding coils of the three-phase current transformer, the resistance of the resistor meets the following requirements: sampling currents at positions under normal plug-in status; maintaining the connection of the secondary loop of the three-phase current transformer under abnormal plug-in status.

The control and protection device of a low-voltage electrical apparatus of the present invention may fully coordinate contactor functions and breaker functions of the device, the device has high breaking ability and long mechanical and electrical lifetime, the device is adapted to different control power supply voltage and may be applied in a variety of protection types, the device is able to increases the reliability of electrical connection and usage. A secondary loop connection detection device therein may avoid potential damages to the security of the primary loop to which it belongs and reliability of a switching electrical apparatus that are caused by the unreliable plug connection of the current detection device and the protection module. The secondary loop connection detection device requires less components, has high reliability, and has the features of small volume and low cost when used in the control and protection switching electrical apparatus.

BRIEF DESCRIPTION OF THE DRAWINGS

The above and other features, natures, and advantages of the invention will be apparent by the following description of the embodiments incorporating the drawings, wherein.

DETAILED DESCRIPTION OF EMBODIMENTS

Figure 1:
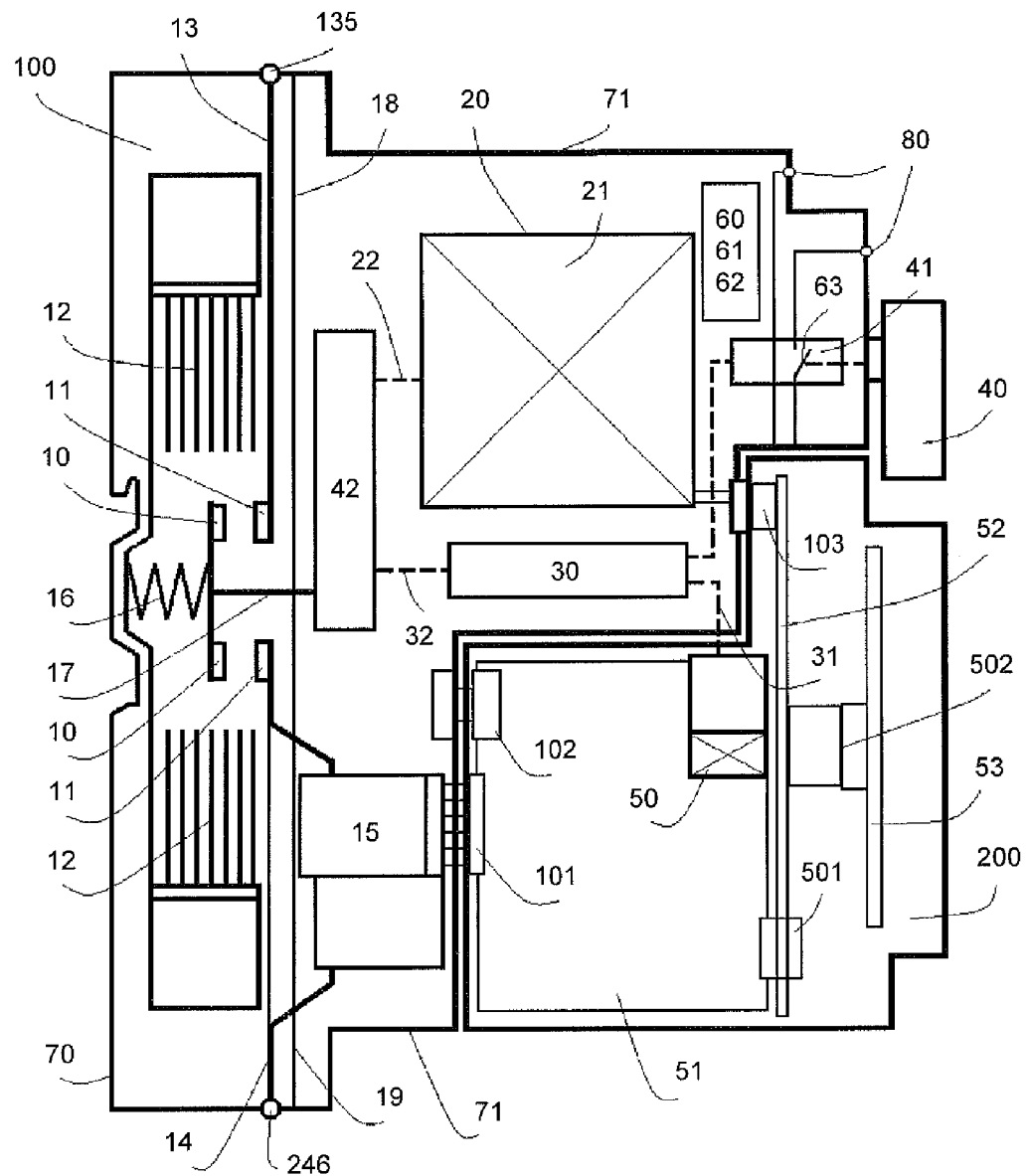
FIG. 1 illustrates a structure diagram of a control and protection device of a low-voltage electrical apparatus according to an embodiment of the present invention.

The main design idea of the present invention is as follows:
A modularized, replaceable, and integrated electrical apparatus having control and protection functions is provided. A current detection device for detecting a current flowing through conductors is in form of a current sensor. A main circuit current conductor constitutes a primary loop directly through the current sensor. A sensing signal of a secondary loop of the current sensor is connected to a signal processing control unit. The signal processing control unit comprises an electrical protection device and an electrical control device. The electrical protection device comprises a tripping device for protection. An electromagnet control device for control is connected to the electrical control device through connection wires.

The electrical apparatus having control and protection functions comprises: a pedestal; and a pluggable and replaceable control and protection module. The pedestal comprises a base and a housing; and further provided with a moving contact, a static contact, and a current conductor connecting to a main circuit; a control electromagnet for controlling the moving contact and the static contact to be closed or opened in response to a man-made control signal; an operation mechanism for controlling the moving contact and the static contact to be closed or opened in response to a man-made control signal; a manual operation knob with which the moving contact and the static contact is controlled to be closed or opened; a control contact, the close or open status of the control contact is controlled by the manual operation knob; and a current sensor for detecting a current that flows through the main circuit current conductor and transferring a detected signal to a signal processing control unit. The control and protection module is provided with a tripping device for protection and a signal processing control unit. The tripping device makes the moving contact and the static contact to be closed or opened by actuating the operation mechanism in the pedestal with a mechanical actuation mechanism, in response to the signal sent by the signal processing control unit in the control and protection module. The signal processing control unit may provide a power supply for controlling the electromagnet and control the status of the electromagnet through electrical circuits.

The control and protection module is pluggable and replaceable. A signal input of the control and protection module is connected to an output signal of the current sensor, and is inputted with an electrical signal generated based on the detection of a current that flows through the current conductor. An output of the control and protection module may output two manners of status conversion: one is a status conversion of mechanical operations, for controlling the status of the mechanical members of the operation mechanism; the other is a status conversion of electrical signals, for controlling status conversion of the electromagnet. The current sensor of the present invention is disposed in the pedestal so that the current conductor connected to the main circuit directly connects to the current sensor and extracts a sensing signal of the secondary loop of the current sensor. The input of a weak electric signal would not cause a surrounding temperature rise inside the control and protection module and thus would not influence the performance and lifetime of related devices. Disposing the current sensor in the pedestal may reduce the plugging force of the plug-in module and facilitate enhancement of structural layout and mechanical performance.

Since the module is pluggable and replaceable, different control and protection modules may be disposed according to the situation and type of usage. Preferably, the control and protection module may have different types of modules according to different protection functions, for example, modules having fundamental protection functions such as short-circuit protection, overload protection, open-phase protection, direct startup are configured as standard-type modules, while modules having multi-functions such as communication, liquid crystal display, and double-power protection are configured as multifunction-type modules.

The present invention also provides an electrical apparatus having control and protection functions. The electrical apparatus has a lower base disposed at a pedestal, the base is isolated with an insulating baffle plate. The base is provided with power supply conductors, separable moving and static contacts, and arc extinction chambers associated with the separable moving and static contacts. An operation mechanism is provided with a transmission mechanism, the transmission mechanism on one hand transfers mechanical signals to a manual operation knob, and on the other hand transfers mechanical signals to the moving contact. The moving contact is associated with the transmission mechanism of the operation mechanism via a contact support. On both ends of the operation mechanism of the apparatus above the base and the insulating baffle plates, a control electromagnet is disposed on one end while a current sensor is disposed on the other end. Preferably, the control electromagnet is disposed on an upper input end of the power supply conductor, and a current sensor is disposed on a lower input end of the power supply conductor. A housing unit is used to correlate a base with the operation mechanism, the control electromagnet, the current sensor and related transmission mechanisms and isolating members to form a closed pedestal, while the base is provided to accommodate the moving and static contacts, the arc extinction chamber, and a main circuit power supply conductor.

The present invention also provides an electrical apparatus having control and protection functions. Preferably, an isolation structure is disposed in the pedestal, so that no extra isolation module outside the apparatus is needed. With a manual control mechanism, the moving and static contacts are kept at an open status reliably, and the open distance between the moving contact and the static contact meets the requirements of isolation.

The present invention also provides an electrical apparatus having control and protection functions. The apparatus is provided with a communication module having communication functions, a residual current control and protection module having residual current protection. The apparatus is connected to an outside auxiliary module and outside signal and alarm modules. Preferably, the communication module is disposed in a multi-functional control and protection module. A pair of auxiliary contacts and a pair of signaling contacts are built in the device having control and protection functions. The outside auxiliary module and the outside signal and alarm modules may be disposed at an upper end or both ends of the electrical apparatus.

According to the above design ideas, the present invention provides the following technical solution:

A control and protection device of a low-voltage electrical apparatus, comprising a pedestal and a control and protection module, the control and protection module is pluggable and replaceable and is plugged into the pedestal.

The pedestal has a base and a housing, the pedestal has disposed therein: a moving contact, a static contact, and a current conductor through which a main circuit current flows, a control electromagnet and an operation mechanism, a manual operation knob, a control contact, and a current sensor.

According to an embodiment, the base in the pedestal has disposed therein:

a multi-polar contact comprising a static contact and a moving contact;

a contact bridge on which the moving contact is disposed;

a spring connected to the contact bridge, the spring applying a spring force to the contact bridge so as to drive the contact bridge and the moving contact to move towards the static contact and make the moving contact and the static contact close;

a contact support connected to the contact bridge, the contact support making the static contact and the moving contact open;

a first current conductor and a second current conductor connected to the main circuit, wherein the static contact is disposed on the first current conductor and the second current conductor that connects to the main circuit, wherein a power supply terminal is disposed on the first current conductor while a load terminal is disposed on the second current conductor;

arc extinction chambers being disposed on both sides of the moving contact and the static contact;

baffle plates disposed on the first current conductor and the second current conductor, the baffle plates isolating the moving contact, the static contact, the contact bridge, the contact support, the arc extinction chamber, the first current conductor, and the second current conductor within the base.

According to an embodiment, the housing is connected to the base, the housing isolates with the base via the baffle plates, the housing has disposed therein:

a current sensor secured on the baffle plates, the current sensor connecting to a second power supply conductor to form a primary loop, a secondary loop of the current sensor outputting a sensing signal to a signal processing control unit;

a control electromagnet comprising a coil and a counterforce spring, the counterforce spring connecting to the contact support via a transmission member, the counterforce spring applying a spring force to the contact support via the transmission member so as to make the moving contact and the static contact open;

an operation mechanism, the operation mechanism connecting to the contact support through the transmission member via a connecting rod, the operation mechanism applying a maintenance force to the contact support via the connecting rod and the transmission member so as to maintain the moving contact and the static contact open;

a control contact, the control contact connecting to the manual operation knob, the status of the control contact being associated with the status position of the manual operation knob;

an auxiliary contact, a signaling contact, and an alarm contact, the auxiliary contact, the signaling contact, and the alarm contact outputting status signals;

an control electromagnet and an operation mechanism, controlling the moving contact and the static contact to close or open in response to a control signal and maintaining the close or open status of the moving contact and the static contact;

a manual operation knob providing the control signal for controlling the moving contact and the static contact to close or open, wherein the manual operation knob rotates clockwise or anticlockwise, the manual operation knob connects to the operation mechanism via a transmission mechanism, wherein the status position of the manual operation knob is associated with the positions of the moving contact and the static contact. A releaser component in the operation mechanism is reset by rotating the manual operation knob anticlockwise. The status position of the manual operation knob is associated with the control and protection module. The control and protection module is in a pluggable status when the status position of the manual operation knob is in a position that makes the moving contact and the static contact open. The control and protection module is in a locked status when the manual operation knob is in a position that makes the moving contact and the static contact close. To achieve the above functions, the manual operation knob may have the following structure: the manual operation knob being clamped into the control and protection module; or the manual operation knob comprising a handle, when the manual operation knob makes the moving contact and the static contact close, the handle of the manual operation knob being clamped onto the control and protection module so as to lock the control and protection module; when the manual operation knob makes the moving contact and the static contact open, the handle of the manual operation knob being separated from the control and protection module so that the control and protection module is pluggable.

a current sensor detecting a current that flows through the main circuit current conductor and generating a sensing signal;

a control and protection module with a signal processing unit and a tripping device disposed therein, wherein the signal processing unit controls the status of the control electromagnet via electrical circuits in response to the sensing signal, and the tripping device controls operations of the operation mechanism via mechanical connections in response to the signal processing unit.

In an embodiment, the control and protection module has disposed therein:

a signal input connected to the current sensor, the signal input receiving a sensing signal output from the current sensor;

a signal processing unit connected to the signal input, the signal processing unit receiving the sensing signal of the current sensor from the signal input and outputting a tripping instruction, the signal processing unit comprising an electrical protection device and an electrical control device, the electrical protection device protecting a tripping device, the electrical control device connecting to a control electromagnet, the electrical control device connecting to a coil of the control electromagnet via connection wires and converting the status of the control electromagnet;

a tripping device connected to the operation mechanism via a mechanical member, the tripping device actuating the releaser component in the operation mechanism via the mechanical member in response to the tripping instruction so as to make the moving contact and the static contact open.

Figure 2:
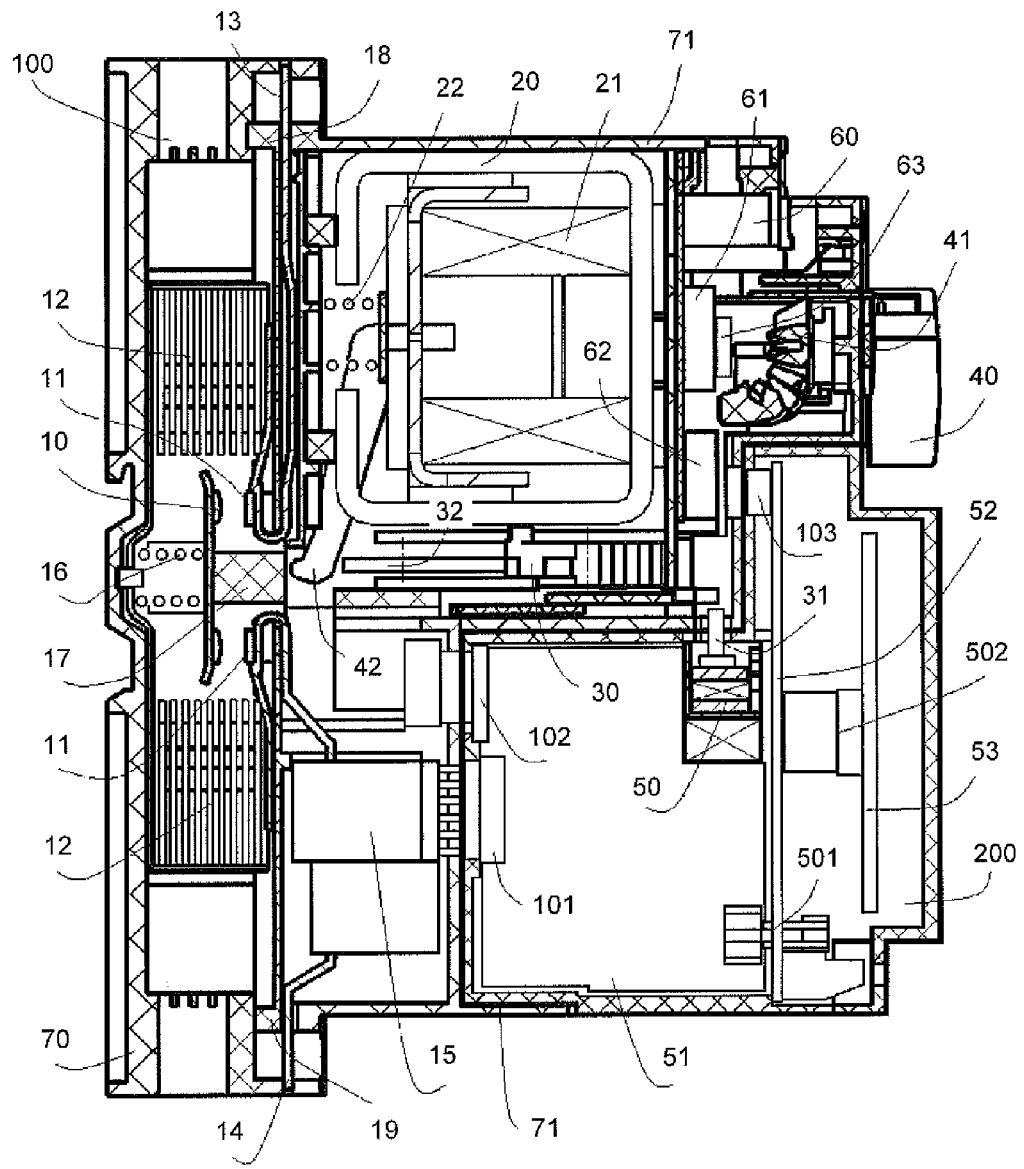
FIG. 2 illustrates a structure diagram of a control and protection device of a low-voltage electrical apparatus according to an embodiment of the present invention.
Figure 3:
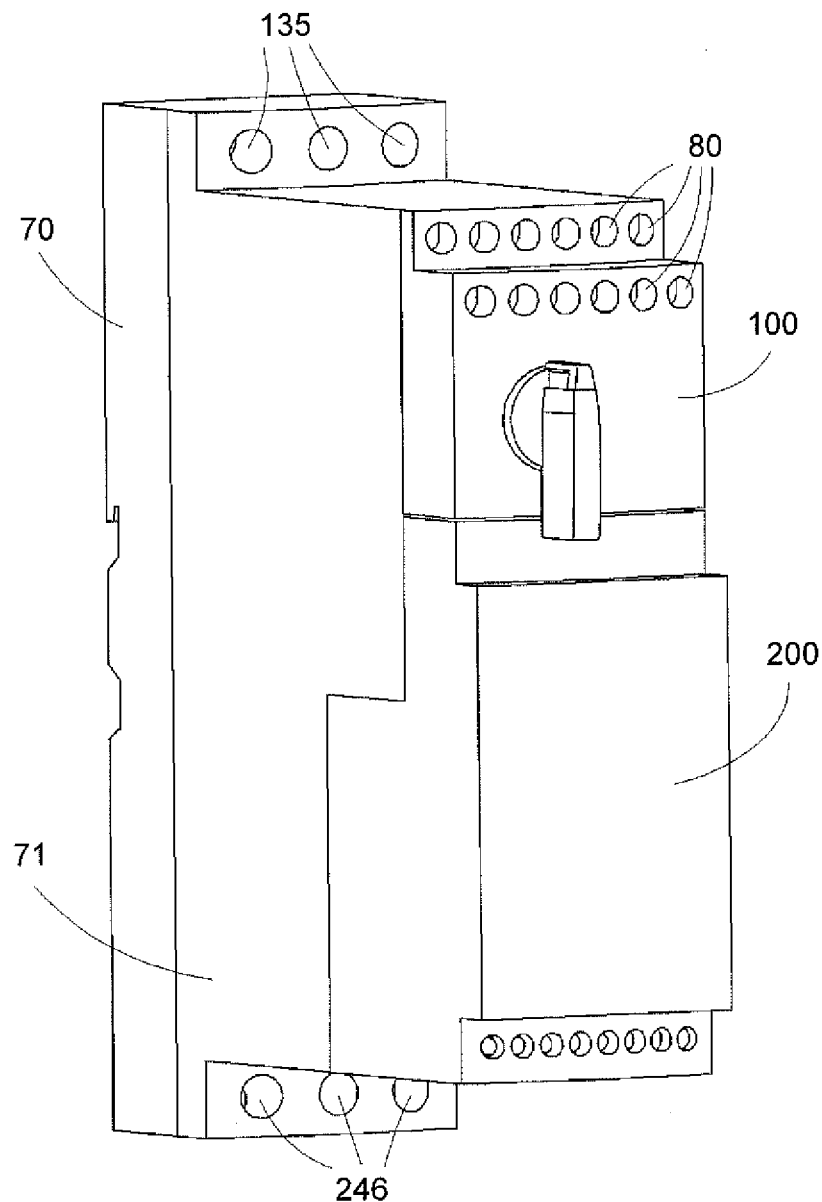
FIG. 3 illustrates an outside diagram of a control and protection device of a low-voltage electrical apparatus according to an embodiment of the present invention.

An exemplary embodiment of the control and protection device of a low-voltage electrical apparatus according to the present invention is illustrated accompanying with FIGS. 1-3. FIG. 1 illustrates a structure diagram of a control and protection device of a low-voltage electrical apparatus according to an embodiment of the present invention. FIG. 2 also illustrates a structure diagram of a control and protection device of a low-voltage electrical apparatus according to an embodiment of the present invention. FIG. 3 illustrates an outside diagram of a control and protection device of a low-voltage electrical apparatus according to an embodiment of the present invention.

As shown in FIGS. 1-3, the control and protection device of the low-voltage electrical apparatus comprises a pedestal 100, and a pluggable and replaceable control and protection module 200.

The pedestal 100 comprises a base 70 having multi-polar contacts disposed therein. These multi-polar contacts include a moving contact 10 and a static contact 11. The moving contact 10 is disposed on a contact bridge. The moving contact 10 closes with the static contact 11 under the spring force of a spring 16, and opens from the static contact 11 under the force applied on a contact support 17. The static contact 11 is disposed on a first power supply conductor 13 and a second power supply conductor 14 that flow through a main circuit. A power supply terminal 135 connects to the first power supply conductor 13. A load terminal 246 connects to the second power supply conductor 14. An arc extinction chamber 12 is correlated with the moving contact 10 and the static contact 11, and is disposed in a cavity of the base 70. Baffle plates 18, 19 are disposed on the first power supply conductor 13 and the second power supply conductor 14 in the base 70. The baffle plates 18, 19 isolate the moving contact 10, the static contact 11, and the arc extinction chamber 12 and associated components within the base 70.

The pedestal 100 further comprises a housing 71 that is correlated with the base 70. A current sensor 15 is disposed in the housing 71. The second power supply conductor 14 directly passes through the current sensor 15 to form a primary loop. A sensing signal of a secondary loop of the current sensor 15 is connected to a signal processing control unit in the control and protection module 200 via a connector 101. The current sensor 15 is secured on the baffle plate 19. A control electromagnet 20 is disposed in the housing 71. The control electromagnet 20 comprises a coil 21 and a counterforce spring 22. The force of the counterforce spring 22 is applied to the contact support 17 via a transmission member 42 so as to separate the moving contact 10 from the static contact 11. The control electromagnet 20 is such designed that the required power supply voltage is independent of a rated control power supply voltage, in other words, the rated control power supply voltage may be AC or DC. For example, when the rated control power supply voltage is selected from 24V or 220V, it is not necessary to change the coil 21, only the selection of control and protection modules 2 with different voltage levels may meet the requirements. The housing 71 has an operation mechanism 30 disposed therein. A connecting rod 32 on the operation mechanism 30 applies a maintenance force to the contact support 17 via the transmission member 42 so as to separate the moving contact 10 from the static contact 11 and maintain the open status of the moving contact 10 and the static contact 11. The housing 71 also has a control contact 63 disposed therein. The status of the control contact 63 is associated with the status position of a manual operation knob 40. The housing 71 may also have disposed therein a pair of auxiliary contacts 60, a pair of signal contacts 61, and a pair of alarm contacts 62 for the device to output status signals. The housing 71 may also has an isolation structure disposed therein. The position of the isolation structure is related to status positions of the moving contact 10 and the static contact 11. The status position of the isolation structure may be changed by the manual operation mechanism.

The pedestal 100 further comprises a manual operation knob 40 which may rotate clockwise anticlockwise. In an embodiment, the manual operation knob 40 may be replaced with two buttons. The manual operation knob 40 is correlated with the operation mechanism 30 via a transmission mechanism 41. The status position of the manual operation knob 40 is associated with the status positions of the moving contact 10 and the static contact 11. The status position of the manual operation knob 40 is also associated with the status position of the control contact 63. The manual operation knob 40 may be used to control ON and OFF status of the device. The status position of the manual operation knob 40 may also be associated with the control and protection module 200. When the status position of the manual operation knob 40 is located at a position that makes the moving contact 10 and the static contact 11 at an open status, the control and protection module 200 is in a pluggable status. When the manual operation knob 40 is at a position that makes the moving contact 10 and the static contact 11 at a close status, the control and protection module 200 is in a locked status. This function may be achieved by clamping a structural member in the manual operation knob 40 into the control and protection module 200. Alternatively, this function may be achieved by setting a handle of the manual operation knob 40 to a certain length, a portion of the handle of the manual operation knob 40 is clamped onto the control and protection module 200 when the manual operation knob 40 makes the moving contact 10 and the static contact 11 close. The control and protection module 200 is not pluggable when the moving contact 10 and the static contact 11 are close. The above two configurations may be used in combination to fasten the clamping.

The pedestal 100 also comprises a wiring terminal 80 for controlling the power supply voltage. The wiring terminal 80 may be configured as one group or two groups. A control contact 63 is disposed on an end of the wiring terminal 80. The power supply voltage is provided to the control and protection module 200 via a connector 102. When the wiring terminal is configured as one group, e.g., the wiring terminal 80 is consisted of A1/A2 terminal, a control contact may be connected external to the A1/A2 terminal, e.g., a control button is connected external to the A1/A2 terminal. The control button may be used to control the status of the power supply voltage. The wiring terminal may also be configured as two groups, e.g., being consisted of two groups of terminals A1/A2 and A3/A4, where the power supply voltage inputted by one terminal group A3/A4 is directly provided to the control and protection module 200, another terminal group A1/A2 is similarly configured as the situation that only one group of terminal is used. Under such configuration, when the externally connected control contact is OFF, the status of the control and protection module 200 will not be influenced by the status of the external control contact, but remains consistent with A3/A4.

The control and protection module 200 is pluggable and replaceable, and comprises a signal input 101 that is connected to an output signal of the current sensor 15. The signal input 101 is used to receive electrical signals associated with a current that flows through a second current conductor 14 of the main circuit to the signal processing control unit. The signal processing control unit comprises an electrical protection device 51 and an electrical control device 52. The electrical protection device 51 comprises a tripping device 50 for the purpose of protection. The tripping device 50 is applied to a signal processing unit that detects signals. A mechanical member 31 of the tripping device 50 is associated with the operation mechanism 30, the mechanical member 31 changes the status of the tripping device 50 upon the signal processing unit detects a fault signal. The mechanical member 31 on the tripping device 50 actuates a releaser component in the operation mechanism 30 to open the moving contact 10 and the static contact 11 quickly via a correlated transmission mechanism 41 and the contact support 17. By rotating the manual operation knob 40 anticlockwise, the releaser component in the operation mechanism 30 is reset. The electrical control device 52 comprises a control unit applied to a control electromagnet 20, the electrical control device 52 connects to a coil 21 of the control electromagnet 20 via a connection wire 103. The electrical control device converts the status of the control electromagnet 20 by sending a signal instruction from a control component in the signal processing control unit. To reduce interference between strong electrical signals and weak electrical signals, the signal processing control unit may at least be configured as including two separate parts for disposing strong electrical components and weak electrical components respectively. A connector 501 is used to transfers the power supply and signals between the two parts.

The control and protection module 200 is pluggable and replaceable. Different control and protection modules 200 may be disposed according to the requirements and type of usage. The control and protection module 200 is provided with modules that are adapted to different power supply voltages, for example, DC24V, AC24V, DC48V, AC48V, DC100V, AC110V, DC220V, and AC220V. In this embodiment, the control and protection module 200 is configured as an AC/DC universal type, that is, only different voltage levels are selected regardless of the AC/DC type of the voltage. Different types of the control and protection modules 200 may be selected according to different protection functions, for example, modules having fundamental protection functions such as short-circuit protection, overload protection, open-phase protection, direct startup are configured as standard-type control and protection modules 200, while modules having multi-functions such as communication, liquid crystal display, and double-power protection are configured as multifunction-type control and protection modules 200. A control and protection module 200 having special protection functions may be customized based on a special situation of usage, for example, being adapted for fire control usage. To facilitate product management and reduce production and management costs, it is useful to separate extended functions from fundamental functions of the signal processing control unit and integrate the extended functions in separate part 53, a connector 502 may be used to transfer the power supply and signals therebetween.

In the control and protection device of a low-voltage electrical apparatus of the present invention, a pair of auxiliary contacts 60 and a pair of signaling contacts 61, 62 may be built in. Extended modules such as an auxiliary module, a signaling module, an alarm module, a reversible module, a voltage control and protection module may be connected external to the control and protection device. These modules may be disposed on an upper end or left/right ends of the electrical apparatus, or may be disposed on front/rear ends of the electrical apparatus or may be separately installed in parallel.

The above-mentioned current sensor 15 comprises a secondary loop connection detection device, the secondary loop connection detection device comprises:

a three-phase current transformer disposed inside the current detection device, a second end of each transformer in the three-phase current transformer connecting together to form a common end, a first end of each current transformer in the three-phase current transformer being independent from each other;

first verification terminals disposed inside the current detection device, each of the first verification terminals being connected to each other, usually two first verification terminals being disposed on the common end and both sides of the first terminal of the three-phase current transformer;

a male terminal formed by the common end, the first end of the three-phase current transformer, and the first verification terminal;

a receiving terminal disposed inside the protection module, the receiving terminal comprising a receiving terminal of the three-phase current transformer and a receiving terminal of the common end;

second verification terminals disposed inside the protection module, the second verification terminals being independent from each other, usually two second verification terminals being disposed on the receiving terminal of the common end and both sides of the receiving terminal of the three-phase current transformer;

a female terminal formed by the receiving terminal of the common end, the receiving terminal of the three-phase current transformer, and the second verification terminals;

where the female terminal matching the male terminal, the receiving terminal of the common end matching the common end, the receiving terminal of the three-phase current transformer matching the first terminal of the three-phase current transformer, the first verification terminals matching the second verification terminals.

In general, the male terminal is consisted of six terminals, while the female terminal is also consisted of six terminals. These six pairs of terminals are considered as a whole integrity. However, it is to be noted that the technical solution of the present invention is not limited to six pairs of terminals. Those configurations that may reflect the plug-in status of the current detection device and the protection module should be considered as being within the scope of the present invention.

The length of the first verification terminals is shorter than the length of the common end and the length of the first terminal of the three-phase current transformer. Accordingly, the length of the second verification terminals is shorter than the length of the receiving terminal of the common end and the length of the receiving terminal of the three-phase current transformer. Thus, when verification terminals that are located at both sides are well plugged in, it is ensured that the four pairs of terminals in the middle are well plugged in (the four pairs of terminals in the middle are much longer), meanwhile it is ensured that the secondary loop of the current detection device is well connected.

Connection detection is performed on the second verification terminals to detect the connection status of the second verification terminals that are arranged independently from each other so as to change the level status of an I/O port of a microprocessor in the protection module. The microprocessor determines the level status of the I/O port as follows:

under the situation that the primary loop is disconnected, when the level is high, the microprocessor sends a signal for connecting the primary loop; when the level is low, the microprocessor prohibits sending a signal for connecting the primary loop;

under the situation that the primary loop is connected, when the level is high, the microprocessor maintains the present status; when the level is low, the microprocessor sends a signal for disconnecting the primary loop.

By detecting the connection of the secondary loop of the current detection device, the ON/OFF status of the primary loop is changed to as to ensure an safe operation of the whole control and protection switching electrical apparatus.

In an embodiment, a resistor is disposed between respective secondary winding coils of the three-phase current transformer. The resistance of the resistor meets the following requirements:

sampling currents at positions under normal plug-in status;

maintaining the connection of the secondary side loop of the three-phase current transformer under abnormal plug-in status.

Upon configuring the resistor, by selecting appropriate resistance, the resistor would not influence the current sampling under normal plug-in status of the current detection device and the protection module in one hand, one the other hand, the resistor would ensure the connection of a secondary side loop of the current transformer under abnormal plug-in status so as to avoid very high voltage induced on the secondary winding coils that may threaten the safety of the current detection device and humans.

Specific implementations of the secondary loop connection detection device are introduced in connection with the accompanying figures. It shall be noted that, these specific implementations intend to facilitate understanding of the present invention, and more clearly show the positive effects of using the secondary loop connection detection device. These specific implementations, however, are not considered as limitations to the present invention.

The secondary loop connection detection device comprises a current detection device and a protection module connection detection circuit.

Figure 4:
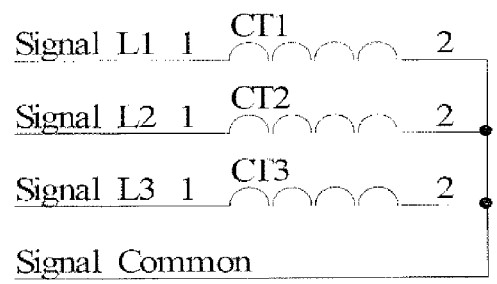
FIG. 4 illustrates a schematic diagram of a secondary winding coil of a three-phase current transformer used in a secondary loop connection detection device according to an embodiment of the present invention.

FIG. 4 illustrates a schematic diagram of a secondary winding coil of a three-phase current transformer used in a secondary loop connection detection device according to an embodiment of the present invention. The three-phase current transformer is disposed in the current detection device. The current detection device is disposed in a power pedestal, where CT1, CT2, CT3 are three secondary windings of the three-phase current transformer, Signal_L1, Signal_L2, Signal_L3 and Signal_Common are four terminals of the secondary windings of the three-phase current transformer, and Signal_Common is a common end among them.

Figure 5:
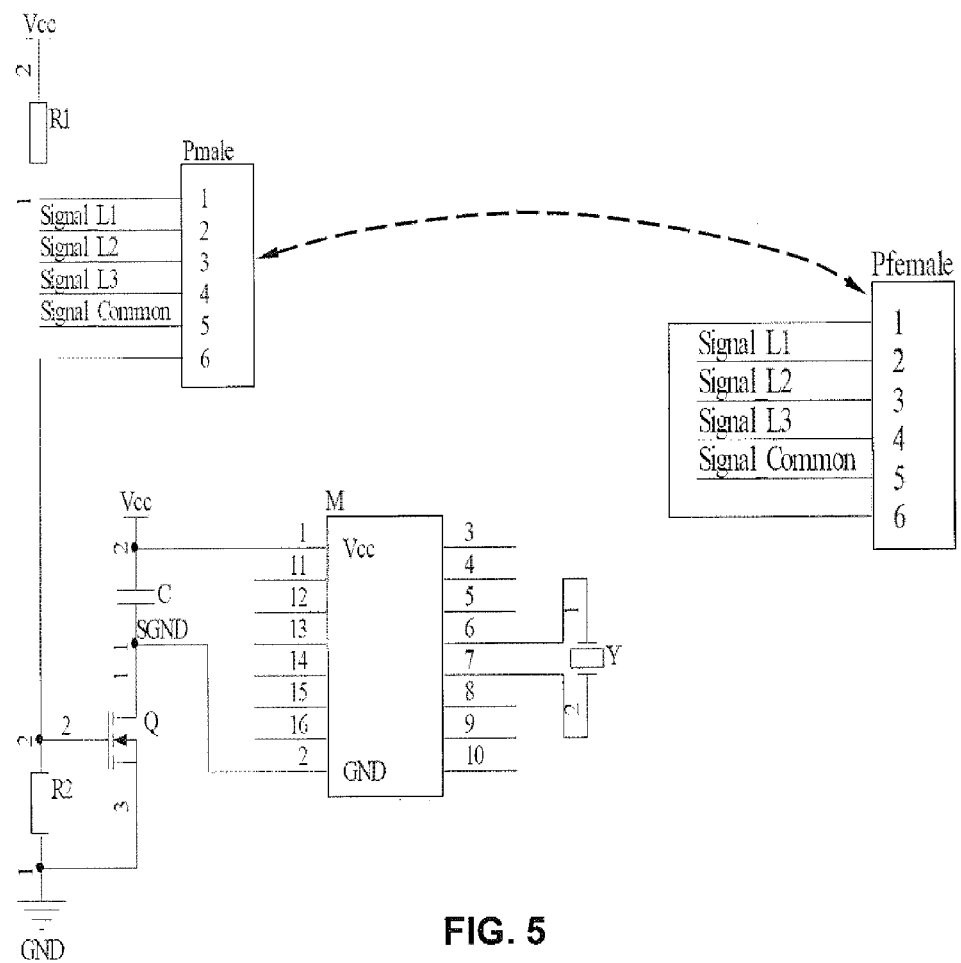
FIG. 5 illustrates a schematic diagram of a connection detection circuit of a current detection device and a protection module in a secondary loop connection detection device according to an embodiment of the present invention.

FIG. 5 illustrates a schematic diagram of a connection detection circuit of a current detection device and a protection module in a secondary loop connection detection device according to an embodiment of the present invention. The detection circuit comprises: a microcontroller M, a crystal oscillator Y, a connecting terminal Pmale (male terminal), a connecting terminal Pfemale (female terminal), resistors R1, R2, an N channel MOS transistor Q, and a capacitor C.

Pin Number 2 of the resistor R1 is connected to the power supply Vcc, and Pin Number 1 of the resistor R1 is connected to Pin Number 1 of the connecting terminal Pmale. Pin Number 2 of Pmale is connected to Pin Number 2 of Pfemale. Pin Number 3 of Pmale is connected to Pin Number 3 of Pfemale. Pin Number 4 of Pmale is connected to Pin Number 4 of Pfemale. Pin Number 5 of Pmale is connected to Pin Number 5 of Pfemale. Pin Number 6 of Pmale is connected to Pin Number 2 of resistor R2 and Pin Number 2 of the N channel MOS transistor Q. Pin Number 1 of the resistor R2 is connected to Pin Number 3 of the N channel MOS transistor Q and is grounded. Pin Number 1 of the N channel MOS transistor Q is connected to Pin Number 1 of the capacitor C and Pin Number 2 of the controller M. Pin Number 2 of the capacitor C is connected to Pin Number 1 of the controller M and is connected to the power supply Vcc. Pin Number 1 of the crystal oscillator Y is connected to Pin Number 6 of the controller M. Pin Number 2 of the crystal oscillator Y is connected to Pin Number 7 of the controller M. Pin Number 1 of Pfemale is connected to Pin Number 6 of Pfemale. The connecting terminal Pfemale is positioned in the power pedestal, while other devices are positioned in the protection module. It is to be noted that the positions of the devices may vary. The connecting terminal Pfemale may be positioned in the protection module while other devices may be positioned in the power pedestal. The microcontroller M is powered by an output signal of a switching power supply, where Vcc and GND are signals output by the switching power supply. When the connecting terminal Pfemale is reliably plugged-in with Pin Number 1 and 6 of the connecting terminal Pmale, Pin number 1 and number 6 of Pmale are connected. Voltage Vcc is divided by resistors R1, R2 and generates a high level on Pin Number 2 of the resistor R2, the N channel MOS transistor Q is ON and its ON pressure drop is less than 0.02V and is negligible compared to Vcc. Thus, Signals SGND and GND are connected, that is, GND of the microcontroller M is connected to GND output by the switching power supply so that the microcontroller M is powered and functions normally so as to perform various control and protection functions. When the connecting terminal Pfemale is not reliably plugged-in with Pin Number 1 and 6 of the connecting terminal Pmale, Pin number 1 and number 6 of Pmale are disconnected. Voltage Vcc cannot be divided via resistors R1, R2 and generates a low level on Pin Number 2 of the resistor R2, the N channel MOS transistor Q is OFF. Thus, GND of the microcontroller M is disconnected with GND output by the switching power supply so that the control and protection switching electrical apparatus cannot be connected and the primary loop cannot work, so as to avoid potential damages to reliability of a control and protection switching electrical apparatus and potential damages to safety of the primary loop that are caused by the unreliable plug-ins of the current transformer and the protection module.

Figure 6:
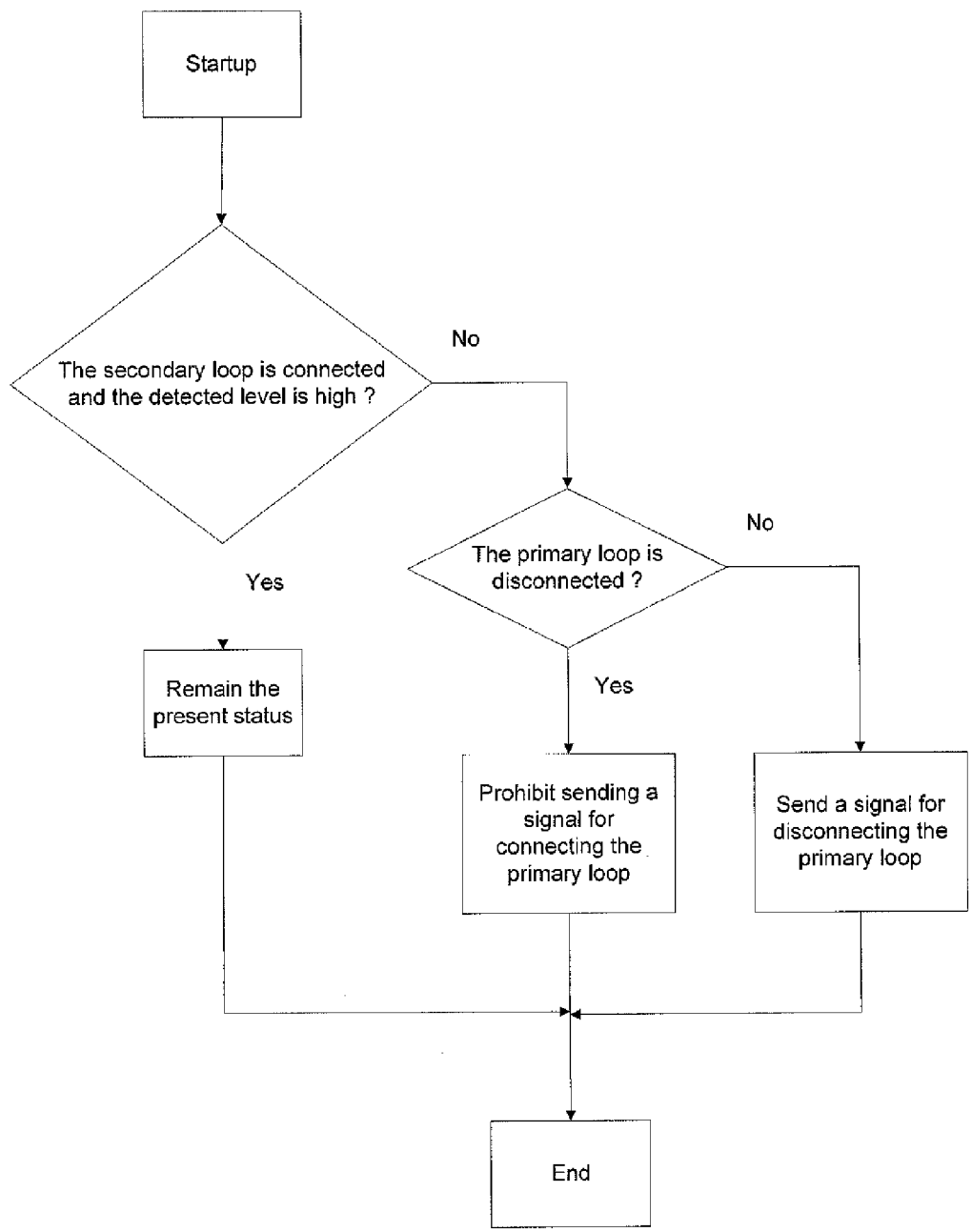
FIG. 6 illustrates a flow chart of a detection program performed in a secondary loop connection detection device according to an embodiment of the present invention.

FIG. 6 illustrates a flow chart of a detection program performed in a secondary loop connection detection device according to an embodiment of the present invention. FIG. 6 discloses the procedure for detection:

First of all, a program in the microprocessor determines a level status of an I/O port: when the level is high, it means that the secondary loop is reliably connected and the program in the microprocessor remains the present status; when the level is low, it means that the secondary loop is not reliably connected.

At this time, when the microprocessor detects a disconnection of the primary loop, the program prohibits sending a signal for connecting the primary loop; when the microprocessor detects a connection of the primary loop, the program sends a signal for disconnecting the primary loop Thus, the primary loop cannot work so as to avoid potential damages to reliability of a control and protection switching electrical apparatus and potential damages to safety of the primary loop that are caused by the unreliable plug-ins of the current transformer and the protection module.

Figure 7:
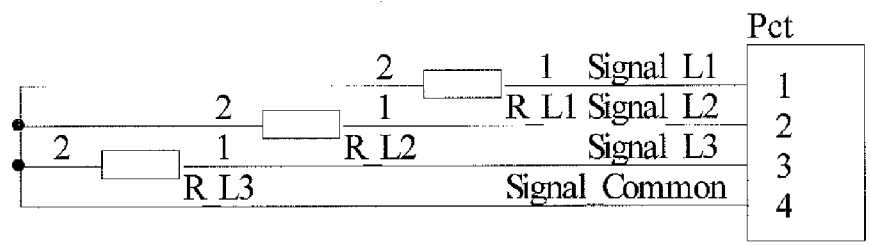
FIG. 7 illustrates a schematic diagram of a protection circuit used in a secondary loop connection detection device according to an embodiment of the present invention.

FIG. 7 illustrates a schematic diagram of a protection circuit used in a secondary loop connection detection device according to an embodiment of the present invention. FIG. 7 is a further schematic diagram of a protection circuit. The circuit is consisted of a connecting terminal Pct and resistors R_L1, R_L2 and R_L3. Pin Number 1 of the terminal Pct is connected to Pin Number 1 of the resistor R_L1. Pin Number 2 of the terminal Pct is connected to Pin Number 1 of the resistor R_L2. Pin Number 3 of the terminal Pct is connected to Pin Number 1 of the resistor R_L3. Pin Number 4 of the terminal Pct is connected to Pin Number 2 of the resistor R_L1, Pin Number 2 of the resistor R_L2 and Pin Number 2 of the resistor R_L3. All the elements are positioned in a power pedestal. The connecting terminal Pct is connected to four terminals of secondary windings of the three-phase current transformer as shown in FIG. 1. The resistances of resistors R_L1, R_L2, and R_L3 meet the requirements: sampling currents at positions under normal plug-in status; maintaining the connection of a secondary side loop of the three-phase current transformer under abnormal plug-in status. Upon configuring the resistors, appropriate resistances are selected so that the resistors would not influence the current sampling under normal plug-in status of the current detection device and the protection module and would ensure the connection of a secondary side loop of the current transformer under abnormal plug-in status so as to avoid very high voltage induced on the secondary winding coils that may threaten the safety of the current detection device and humans.

Figure 8:
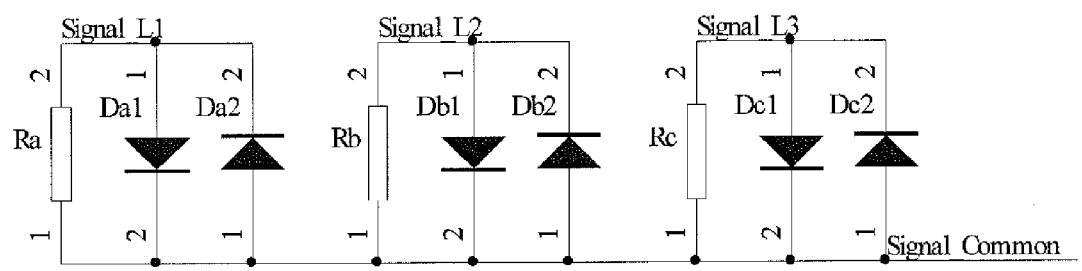
FIG. 8 illustrates a schematic diagram of a current transformer signal processing circuit used in a secondary loop connection detection device according to an embodiment of the present invention.

FIG. 8 illustrates a schematic diagram of a current transformer signal processing circuit used in a secondary loop connection detection device according to an embodiment of the present invention. This circuit is consisted of resistors Ra, Rb, Rc, and diodes Da1, Da2, Db1, Db2, Dc1, Dc2. Pin Number 1 of resistor Ra is connected to Pin Number 2 of diode Da1, Pin Number 1 of diode Da2, Pin Number 1 of resistor Rb, Pin Number 2 of diode Db1, Pin Number 1 of diode Db2, Pin Number 1 of resistor Rc, Pin Number 2 of diode Dc1, Pin Number 1 of diode Dc2. Pin Number 2 of resistor Ra is connected to Pin Number 1 of diode Da1 and Pin Number 2 of diode Da2. Pin Number 2 of resistor Rb is connected to Pin Number 1 of diode Db1 and Pin Number 2 of diode Db2. Pin Number 2 of resistor Rc is connected to Pin Number 1 of diode Dc1 and Pin Number 2 of diode Dc2. All the elements are positioned in the protection module. When all the pins of the connecting terminal Pfemale and the connecting terminal Pmale are reliably plugged-in, signals Signal_L1, Signal_L2, Signal_L3 and Signal_Common on the connecting terminal Pct (i.e., signals of the three-phase current transformer) that is within the power pedestal may be reliably transferred into the protection module. At this time, the respective resistances between Signal_Common and Signal_L1, Signal_L2, Signal_L3 are R_L1*Ra/(R_L1+Ra), R_L2*Rb/(R_L2+Rb), R_L3*Rc/(R_L3+Rc). These resistances all meet the design goals of current sampling. Signal_L1, Signal_L2, and Signal_L3 are transferred via subsequent processing circuits to the microcontroller M, which may achieve various control and protection functions. When the connecting terminal Pfemale is not reliably plugged-in with Pin Numbers 2-5 of the connecting terminal Pmale, Signals L1, Signal_L2, Signal_L3, Signal_Common on the connecting terminal Pct positioned within the power pedestal cannot be transferred into the protection module. At this time, since there are no resistors R_L1, R_L2 and R_L3, Signal_L1, Signal_L2 and Signal_L3 are disconnected with Signal_Common, that is, the secondary loop of the current transformer is not connected so that the current transformer and humans are threatened. In this embodiment, resistors R_L1, R_L2 and R_L3 are respectively inserted between Signal_Common and Signal_L1, Signal_L2 and Signal_L3 so that the resistances in the secondary windings of the three-phase current transformer are respectively R_L1, R_L2, and R_L3. These resistances meet the design goals of security of the current transformer and humans so as to avoid potential damages to security of the current detection device of the control and protection switching electrical apparatus and humans that are caused by unreliable plug-ins of the current detection device and the protection module.

The control and protection device of a low-voltage electrical apparatus of the present invention may fully coordinate contactor functions and breaker functions of the device, the device has high breaking ability and long mechanical and electrical lifetime, the device is adapted to different control power supply voltage and may be applied in a variety of protection types, the device is able to increases the reliability of electrical connection and usage. A secondary loop connection detection device therein may avoid potential damages to the security of the primary loop to which it belongs and reliability of a switching electrical apparatus that are caused by the unreliable plug connection of the current detection device and the protection module. The secondary loop connection detection device requires less components, has high reliability, and has the features of small volume and low cost when used in the control and protection switching electrical apparatus.

The above embodiments are provided to those skilled in the art to realize or use the invention, under the condition that various modifications or changes being made by those skilled in the art without departing the spirit and principle of the invention, the above embodiments may be modified and changed variously, therefore the protection scope of the invention is not limited by the above embodiments, rather, it should conform to the maximum scope of the innovative features mentioned in the Claims.

What is claimed is:

1. A control and protection device of a low-voltage electrical apparatus, comprising:
   a pedestal, the pedestal having a base and a housing, the pedestal including therein:
      a moving contact, a static contact, and a current conductor connecting to a main circuit;
      a control electromagnet and an operation mechanism, the control electromagnet and the operation mechanism controlling the moving contact and the static contact to close or open in response to a control signal, the control electromagnet and the operation mechanism maintaining the close or open statuses of the moving contact and the static contact;
      a manual operation knob, providing the control signal for controlling the close or open of the moving contact and the static contact;
      a control contact connected to the manual operation knob;
      a current sensor, detecting a current that flows through the current conductor connecting to the main circuit and generating a sensing signal;
   a control and protection module, the control and protection module being pluggable and replaceable, the control and protection module being plugged in the pedestal, the control and protection module including therein:
      a signal processing unit, controlling the status of the control electromagnet by electrical circuits in response to the sensing signal;
      a tripping device, controlling operations of the operation mechanism through mechanical connection in response to the signal processing unit.

2. The control and protection device of a low-voltage electrical apparatus according to claim 1, wherein the base comprises therein:
   a multi-polar contact including a static contact and a moving contact;
   a contact bridge on which the moving contact is disposed;
   a spring connected to the contact bridge, the spring applying a spring force to the contact bridge so as to drive the contact bridge and the moving contact to move towards the static contact and make the moving contact and the static contact close;
   a contact support connected to the contact bridge, the contact support making the static contact and the moving contact open;
   a first current conductor and a second current conductor connecting to the main circuit, the static contact being disposed on the first current conductor and the second current conductor connecting to the main circuit, a power supply terminal being disposed on the first current conductor while a load terminal being disposed on the second current conductor;
   arc extinction chambers being disposed on both sides of the moving contact and the static contact.

3. The control and protection device of a low-voltage electrical apparatus according to claim 2, wherein the base comprises therein:
   baffle plates disposed on the first current conductor and the second current conductor, the baffle plates isolating the moving contact, the static contact, the contact bridge, the contact support, the arc extinction chamber, the first current conductor, and the second current conductor within the base.

4. The control and protection device of a low-voltage electrical apparatus according to claim 1, wherein the housing is connected to the base, the housing is isolated with the base via the baffle plates, the housing comprises therein:
   the current sensor being secured on the baffle plates, the current sensor connecting to a second power supply conductor to form a primary loop, a secondary loop of the current sensor outputting a sensing signal to the signal processing unit;
   the control electromagnet comprising a coil and a counterforce spring, the counterforce spring connecting to the contact support via a transmission member, the counterforce spring applying a spring force to the contact support via the transmission member so as to make the moving contact and the static contact open;
   the operation mechanism, the operation mechanism connecting to the contact support through a connection rod and the transmission member, the operation mechanism applying a maintenance force to the contact support via the connecting rod and the transmission member so as to maintain the moving contact and the static contact open;
   a control contact, the control contact connecting to the manual operation knob, the status of the control contact being associated with the status position of the manual operation knob.

5. The control and protection device of a low-voltage electrical apparatus according to claim 4, wherein the housing further comprises therein an auxiliary contact, a signaling contact, and an alarm contact, where the auxiliary contact, the signaling contact, and the alarm contact outputting status signals.

6. The control and protection device of a low-voltage electrical apparatus according to claim 4, wherein the base has a wiring terminal disposed thereon, the wiring terminal controls a power supply voltage, an end of the wiring terminal is connected to the control contact.

7. The control and protection device of a low-voltage electrical apparatus according to claim 1, wherein,
   the manual operation knob rotates clockwise or anticlockwise, the manual operation knob connects to the operation mechanism via a driving mechanism, the status position of the manual operation knob is associated with the positions of the moving contact and the static contact, a releaser component in the operation mechanism is reset by rotating the manual operation knob anticlockwise;

the status position of the manual operation knob is associated with the control and protection module, the status position of the manual operation knob is in a position that makes the moving contact and the static contact open while the control and protection module is in a pluggable status, the manual operation knob is in a position that makes the moving contact and the static contact close while the control and protection module is in a locked status.

8. The control and protection device of a low-voltage electrical apparatus according to claim 7, wherein,
the manual operation knob is clamped into the control and protection module; or
the manual operation knob comprises a handle, when the manual operation knob makes the moving contact and the static contact close, the handle is clamped onto the control and protection module so that the control and protection module is locked, when the manual operation knob makes the moving contact and the static contact open, the handle is separated from the control and protection module so that the control and protection module is pluggable.

9. The control and protection device of a low-voltage electrical apparatus according to claim 1, wherein the control and protection module comprises therein:
a signal input connected to the current sensor, the signal input receiving the sensing signal output from the current sensor;
the signal processing unit connected to the signal input, the signal processing unit receiving the sensing signal of the current sensor from the signal input and outputting a tripping instruction;
the tripping device connected to the operation mechanism via a mechanical member, the tripping device actuating a releaser component in the operation mechanism via the mechanical member in response to the tripping instruction so as to make the moving contact and the static contact open.

10. The control and protection device of a low-voltage electrical apparatus according to claim 9, wherein the signal processing unit comprises:
an electrical protection device for protecting the tripping device;
an electrical control device connected to the control electromagnet, the electrical control device connecting to a coil of the electromagnet via connection wires and converting the status of the control electromagnet.

11. The control and protection device of a low-voltage electrical apparatus according to claim 1, wherein the current sensor comprises a secondary loop connection detection device, the secondary loop connection detection device comprises:
a three-phase current transformer disposed inside the current detection device, a second end of each transformer in the three-phase current transformer connecting together to form a common end, a first end of each current transformer in the three-phase current transformer being independent from each other;
first verification terminals disposed inside the current detection device, each of the first verification terminals being connected to each other;
a male terminal formed by the common end, the first end of the three-phase current transformer, and the first verification terminal;
a receiving terminal disposed inside the protection module, the receiving terminal comprising a receiving terminal of the three-phase current transformer and a receiving terminal of the common end;
second verification terminals disposed inside the protection module, the second verification terminals being independent from each other;
a female terminal formed by the receiving terminal of the common end, the receiving terminal of the three-phase current transformer, and the second verification terminals;
wherein the female terminal matches the male terminal, the receiving terminal of the common end matches the common end, the receiving terminal of the three-phase current transformer matches the first terminal of the three-phase current transformer, the first verification terminals matches the second verification terminals.

12. The control and protection device of a low-voltage electrical apparatus according to claim 11, wherein within the secondary loop connection detection device:
there are two first verification terminals and the two first verification terminals are disposed on both sides of the common end and the first end of the three-phase current transformer;
there are two second verification terminals and the two second verification terminals are disposed on the receiving terminal of the common end and both sides of the receiving terminal of the three-phase current transformer.

13. The control and protection device of a low-voltage electrical apparatus according to claim 12, wherein within the secondary loop connection detection device:
the length of the first verification terminals is shorter than the length of the Common end and the first terminal of the three-phase current transformer;
the length of the second verification terminals is shorter than the length of the receiving terminal of the common end and the receiving terminal of the three-phase current transformer.

14. The control and protection device of a low-voltage electrical apparatus according to claim 11, wherein within the secondary loop connection detection device:
connection detection is performed on the second verification terminals that are independent from each other so as to convert the level status of an I/O port of a microprocessor in the protection module, the level status of the I/O port is determined by the microprocessor;
under the situation that the primary loop is disconnected, when the level is high, the microprocessor sends a signal for connecting the primary loop; when the level is low, the microprocessor prohibits sending the signal for connecting the primary loop;
under the situation that the primary loop is connected, when the level is high, the microprocessor maintains the present status; when the level is low, the microprocessor sends a signal for disconnecting the primary loop;
converting the ON/OFF status of the primary loop by detecting the connection of the secondary loop with the current detection device.

15. The control and protection device of a low-voltage electrical apparatus according to claim 11, wherein within the secondary loop connection detection device:
a resistor is disposed between respective secondary winding coils of the three-phase current transformer, the resistance of the resistor meets the following requirements:
sampling currents at positions under normal plug-in status;

maintaining the connection of the secondary loop of the three-phase current transformer under abnormal plug-in status.

\* \* \* \* \*